United States Patent [19]

McQuoid

[11] Patent Number: 4,669,811

[45] Date of Patent: Jun. 2, 1987

[54] OPTICAL FILTERING APPARATUS

[75] Inventor: J. Allister McQuoid, St. Asaph, Wales

[73] Assignee: Pilkington P.E. Limited, United Kingdom

[21] Appl. No.: 668,648

[22] Filed: Nov. 6, 1984

[30] Foreign Application Priority Data

Nov. 17, 1983 [GB] United Kingdom ............... 8330730

[51] Int. Cl.$^4$ .................. G02B 5/32; G02B 5/18; G02B 5/22
[52] U.S. Cl. .................. 350/3.7; 350/162.23; 350/313
[58] Field of Search ............ 350/3.7, 313, 316, 162.23

[56] References Cited

U.S. PATENT DOCUMENTS

| 2,881,663 | 4/1959 | Dearborn | 350/316 |
| 3,675,990 | 7/1972 | Kogelnik et al. | 350/3.7 |
| 4,208,637 | 6/1980 | Matsuda et al. | 372/7 |

FOREIGN PATENT DOCUMENTS

| 1029078 | 12/1963 | United Kingdom . |
| 2014752B | 1/1979 | United Kingdom . |
| 2151036A | 11/1984 | United Kingdom . |

Primary Examiner—John K. Corbin
Assistant Examiner—D. Edmondson
Attorney, Agent, or Firm—F. Eugene Davis, IV; Mark P. Stone

[57] ABSTRACT

A well defined passband for an optical reflection filter is achieved by causing light to be reflected at least twice from a holographic wavelength selective reflector. Preferably the wavelength/reflectivity characteristics differ at the two reflections to give relatively shifted, but overlapping, spectral passbands. The apparatus may comprise a fibre optic input cable which directs light at the holographic reflector and a corner cube reflector which returns the reflected light for a second reflection prior to receipt by a detector.

9 Claims, 5 Drawing Figures

OPTICAL FILTERING APPARATUS

BACKGROUND OF THE INVENTION

This invention concerns improvements in or relating to optical filtering apparatus, and relates more particularly to such apparatus employing a holographic wavelength selective reflector.

Holographic wavelength selective reflectors can have advantages over other types of spectral optical filters by way of improved performance in terms of efficiency and a well defined spectral passband (i.e. the waveband selectively reflected by the hologram). However, there remain requirements for even better defined, and possibly narrower, spectral passbands. There is also a continuing requirement for reduction of unwanted background arising from spectral sideband reflections of the hologram and/or surface reflections at the surfaces of the substrate carrying the hologram coating. The latter can be reduced by application of an appropriate anti-reflection coating to the relevant surface but this tends to be a fairly expensive operation.

SUMMARY OF THE INVENTION

According to the present invention there is provided optical filtering apparatus comprising a holographic wavelength selective reflector, light input means for introducing light to the reflector, light return means for receiving light reflected from the reflector at a first reflection and for returning that light to the reflector for at least a second reflection, and receiving means for receiving the light reflected at least twice from the reflector. By such plurality of two or more reflections from the holographic reflector, the performance can be improved and the background reduced in a manner fully explained later.

The holographic reflector may comprise a substrate having a hologram coating or film of varying refractive index through its thickness such that there are uniform refractive index planes or strata effectively providing apparent layers of relatively high and low index extending generally parallel to the substrate surface carrying the coating or film. The hologram may be substantially uniform so as to have substantially the same wavelength/reflectivity characteristics over its full operative area. Alternatively, the hologram may be a varying hologram whose wavelength/reflectivity characteristics change over its area.

In particular the characteristics may continuously and progressively change along the length of the hologram or reflector.

The wavelength/reflectivity characteristics may be the same at the first reflection as at the second reflection. Thus, with a substantially uniform hologram the light return means may be arranged to provide the same angle of incidence for the second reflection as for the first.

However, as fully explained later, it can be advantageous to have different respective wavelength/reflectivity characteristics at the two reflections, and in particular to have relatively shifted, but overlapping, spectral passbands so as to achieve a narrowed output or resultant passband. Thus, with a substantially uniform hologram the light return means may be arranged to provide a different angle of incidence for the second reflection with respect to the first. With a varying hologram the light return means may be arranged to effect a spatial displacement between the two reflections relative to the hologram, and in particular to cause a shift or displacement along the hologram or reflector of the returned light with respect to the received light. If desired, the light return means may be arranged to effect both a change in angle of incidence and a spatial displacement relative to the hologram of the second reflection with respect to the first.

The holographic reflector may be tunable so as to be capable of varying the output or resultant passband. Thus, with a substantially uniform hologram the reflector may be angularly moveable to alter the angle of incidence of the introduced light at the first reflection, the light return means also being angularly moveable so that it can be positioned to receive and return the first reflected light throughout the range of angular movement of the reflector. In particular, a drive connection may be provided between the reflector and the light return means to move the latter at twice the angular rate of the former. With a varying hologram, the reflector may be linearly moveable relatively to the light input means so that the position of the first reflection relative to the hologram can be altered, and can in particular be progressed along the hologram. With a varying hologram the reflector, and light return means, may also be ang ularly moveable.

The light introduced to the reflector is preferably, but need not necessarily be, collimated. When it is not collimated, e.g. is in the form of a divergent beam, the light return means may be adapted to allow for the geometrical form of the introduced light, e.g. to return to the reflector a convergent light beam.

The light input means may conveniently comprise a fibre optic cable, which may have collimating means at its end. The light return means may conveniently comprise a corner-cube reflector, or, if the returned light is to be angled with respect to the received light, a modified corner cube reflector having one reflecting face angled so as not to be orthogonal to the other two. The receiving means may conveniently be a detector, or light directing means such as an optical fibre for directing light to a detector or other receiver.

The apparatus may be arranged so that the light twice reflected from the reflector undergoes one or more further reflections at the reflector prior to receipt by the receiving means, and may therefore comprise an appropriate plurality or light return means.

The apparatus may provide a de-multiplexer (or a multiplexer) which may involve successive passes at the holographic reflector to separate out (or combine) a plurality or wavelength channels. In this case there may be provided light return means for each pass position arranged so that light first reflected at a pass is returned for a second reflection by the hologram before receipt by respective receiving means.

BRIEF DESCRIPTION OF THE DRAWINGS

In order that the invention may be better understood, reference will now be made to the accompanying drawings which are given by way of illustration and example, and in which.

DETAILED DESCRIPTION

Figure 1:
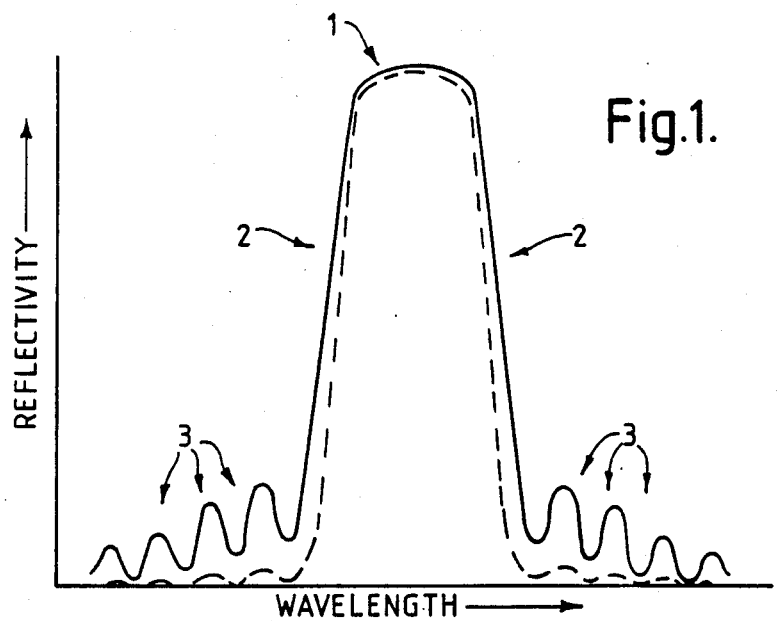
FIGS. 1 and 2 diagrammatically represent spectral reflectivity characteristics of holographic filters, and FIGS. 3, 4 and 5 schematically represent embodiments of optical filtering apparatus in accordance with the invention employing holographic reflection filters having spectral characteristics of the type shown in FIGS. 1 or 2.

A holographic reflector or reflection filter comprising a substrate having a hologram coating or film of varying refractive index through its thickness such that there are uniform refractive index planes or strata which, in effect, provide apparent layers of relatively high and low index lying generally parallel to the substrate surface carrying the coating or film typically has reflectivity/wavelength characteristics (for a constant angle of incidence) of the form represented by the full line curve in FIG. 1. The notable characteristics are a high reflectivity 1, for example about 99%, at the peak wavelength, fairly steep sides 2 to the hump defining the narrow waveband of high reflectivity (or 'passband') and a series of side bands 3 of relatively low reflectivity, for example about 10%. The sidebands, possibly together with surface reflections of for example about 4% reflectivity right across the spectrum, provide background which is usually unwanted. If light which has been reflected by the filter is returned thereto (at the same angle of incidence) to be reflected again, the output or resultant is as illustrated by the broken line curve in FIG. 1. At any given wavelength this has a reflectivity which is the product of the reflectivities at the two reflections, i.e. with identical reflections the square of the reflectivity given by the full line curve in FIG. 1. Thus, for example, a peak reflectivity of about 99% at the first reflection becomes after the second reflection about 98%; a sideband reflectivity of about 10% at the first reflection becomes after the second reflection about 1%; a surface reflection of about 4% reflectivity at the first reflection becomes after the second reflection about 0.16%. The double reflection therefore keeps high reflectivity reasonably high but substantially reduces low reflectivity. This has the effect of steepening the sides of the high reflectivity hump and thereby more clearly defining the passband, and of reducing the background caused both by sidebands and by surface reflections. The advantage of a more clearly defined passband is that a more precise wavelength cut-off between reflected and non-reflected light can be achieved. The advantage of background reduction is improved performance in reducing reflection of unwanted wavelengths, and/or reduced cost in that the need for an anti-reflection coating may be avoided. It will be understood, of course, that the effects can be further enhanced by causing the light to undergo further reflections by the filter hologram beyond two. FIG. 1 assumes that the second reflection is identical to the first, i.e. is subject to the same wavelength/reflectivity characteristics. Further desirable effects can be achieved if the wavelength/reflectivity characteristics for the second reflection are shifted slightly with respect to those for the first reflection.

Figure 2:
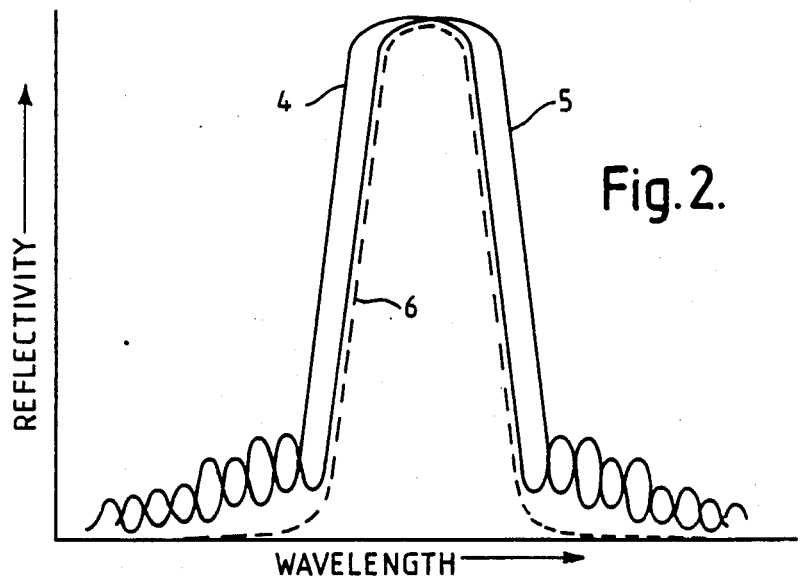

FIG. 2 illustrates this by respective full line curves 4 and 5 showing the wavelength/reflectivity characteristics for the first and second reflections, and a broken line curve 6 for the output or resultant following both reflections. The central peak wavelengths of the first and second reflections are relatively shifted or displaced, but the respective passbands overlap. The output or resultant reflectivity at any given wavelength is the product of the reflectivities at that wavelength at the two reflections. The effect is to narrow the spectral bandpass to a resultant or output passband within the area of overlap of the two respective passbands.

The background reduction occurs as already described with reference to FIG. 1, and, where there are significant regularly spaced sidebands, can be further reduced by making the relative shift or displacement between the first and second reflection respective peak wavelengths equal to half the distance between sideband peaks. As shown in FIG. 2, the sideband peak or maximum reflectivity wavelengths of one reflection can then coincide with the trough or minimum reflectivity wavelengths between sidebands of the other reflection. This can not only reduce, but also even out, the sideband background effect. For example, with a sideband peak or maximum reflectivity of 10% and a trough or minimum reflectivity of 2%, then the resultant reflectivity at coinciding peaks and troughs is 0.2% (whereas in FIG. 1 coinciding peaks would give 1% and coinciding troughs would give 0.04%). However, the value of doing this is dependent on the shape of the sideband curves. As with FIG. 1, further background reduction can be achieved by further reflections of the light at the filter.

Figure 3:
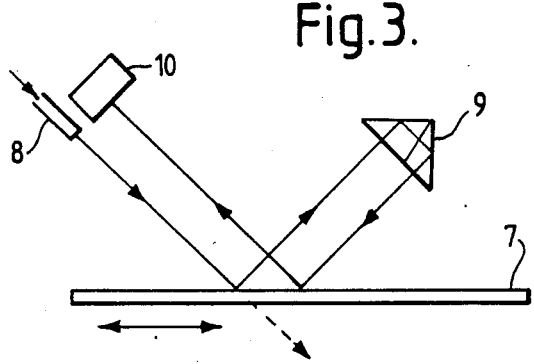

FIG. 3 schematically shows an embodiment of wavelength selective optical filtering apparatus comprising a holographic reflector 7 having wavelength/reflectivity characteristics (for a given angle of incidence) of the form shown in FIG. 1. A collimated light beam from an input fibre optic cable 8 strikes the filter 7 and light of a wavelength in the spectral passband is reflected by the filter, light of other wavelengths being transmitted therethrough. The reflected beam is received by a light return corner-cube retro-reflector 9 which returns it to the filter for a second reflection at the same angle of incidence as the first. The beam twice reflected from the filter is received by a detector 10.

With a filter 7 having a uniform hologram, i.e. with uniformly spaced apparent refractive index layers parallel to the substrate surface carrying the hologram coating or film, so that it has the same wavelength/reflectivity characteristics over its full operative area, the two reflections are identical and the effect of the double reflection in FIG. 3 is as illustrated in FIG. 1. However, the filter 7 may have a hologram whose wavelength/reflectivity characteristics vary over its area, and in particular may have apparent refractive index layers generally parallel to the substrate surface carrying the hologram coating or film but slightly relatively inclined so that their spacing continuously progressively increases along the length of the filter whereby the wavelength of light selectively reflected (with a given angle of incidence) continuously and progressively changes along the length of the filter (as described in U.K. Patent Application No. 8330650). In this case, since the second reflection is, through the action of the corner-cube reflector, slightly displaced along the filter hologram with respect to the first reflection, the effect of the double reflection in FIG. 3 is then as illustrated in FIG. 2. The use of a such a varying hologram filter 7 enables a desired wavelength channel to be separated out from a plurality of wavelength channels transmitted by the fibre optic cable 8 by moving the filter 7 (horizontally to the left or the right as viewed in FIG. 3) relatively to the input 8 so as suitably to locate the filter for reflection of the desired wavelength channel. It will be understood that such relative movements may be effected by moving the filter 7 past a stationary input 8, or by moving the input 8 along a stationary filter 7, or possibly by moving both the filter and the input.

Figure 4:
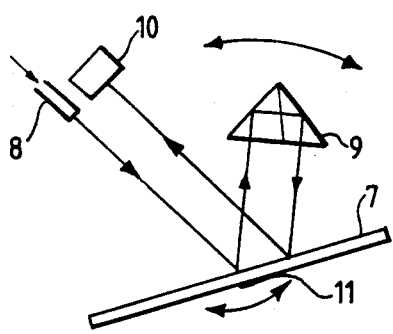

FIG. 4 schematically illustrates another embodiment of wavelength selective optical filtering apparatus. In this embodiment the holographic reflector 7 is angularly moveable about an axis 11 orthogonal to the plane of the drawing. The angle of incidence of the collimated light beam from the fibre optic cable input 8, which is at a fixed position and inclination relative to the axis 11, can therefore be varied by angular movement of the filter. With a filter 7 having a uniform hologram, the wavelength of light selectively reflected is dependent on the angle of incidence and therefore varies with the angle of incidence. The filter 7 can thus be moved about the axis 11 to an appropriate angular position to reflect a desired wavelength channel. The corner-cube reflector 9 is moved about the axis 11 at twice the angular rate of the filter 7, there being a suitable drive connection between them. The corner-cube reflector 9 is thus located throughout the range of movement of the filter 7 to receive the light beam first reflected from the hologram and to return it to the hologram for a second reflection at the same angle of incidence as the first. The twice reflected beam is received by the detector 10 which is in fixed positional relationship to the axis 11, and the effect is again as illustrated in FIG. 1. It will be understood that relative angular movements in the FIG. 4 embodiment could otherwise be achieved, for example with a stationary filter and appropriate angular movements of the input 8, detector 10 and corner-cube reflector 9, or possibly with a stationary corner-cube reflector 9 and appropriate angular movements of the filter 7, the input 8 and the detector 10.

The filter 7 in the FIG. 4 embodiment may, instead of being uniform as described above, be progressively varying as previously mentioned in relation to the FIG. 3 embodiment. At any given angular setting of the filter 7 about the axis 11, there would be a spectral shift or displacement between the two reflections because of the variation along the hologram, and the effect would then be as illustrated in FIG. 2.

Figure 5:
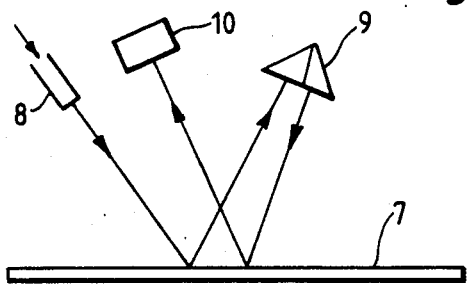

FIG. 5 schematically shows a further embodiment for achieving an effect as illustrated in FIG. 2. In this embodiment a spectral shift or displacement between the two reflections is effected by having a different angle of incidence of the beam at the second reflection from that at the first reflection. This is done by means of a modified corner-cube reflector 9 having one reflecting face deliberately angled so as not to be orthogonal to the other two, whereby the returned beam is angled relative to the received beam. Thus the collimated input beam from the fibre optic cable 8 strikes the filter 7 at a first angle of incidence and the relevant wavelengths selectively reflected by the hologram at the first reflection travel as a reflected beam which is received by the modified corner-cube reflector 9. The beam returned by the modified corner-cube reflector 9 strikes the filter 7 at a second angle of incidence, different from the first, and the relevant wavelengths selectively reflected by the hologram at the second reflection travel as an output or resultant beam to the detector 10 which is appropriately located to receive it. The filter 7 may have a uniform hologram so that the spectral shift between the first and second reflections is caused solely by the change in angle of incidence. The filter 7 could, however, have a progressively varying hologram as mentioned above with reference to FIG. 3, in which case the spectral shift between the two reflections is caused by a combination of the change in angle of incidence resulting from the modified corner-cube reflector together with the movement or displacement along the hologram as described above in relation to the FIG. 3 embodiment with a varying hologram.

It will be appreciated that a modified corner-cube reflector 9 as in the FIG. 5 embodiment could also be used in the FIG. 4 embodiment so that, at and given angular setting of the filter 7 about the axis 11, the different angles of incidence at the first and second reflections respectively produce a spectral shift with a uniform hologram filter, or contribute to a spectral shift with a varying halogram filter.

It will further be appreciated that the specific embodiments shown and described are of relatively simple form for purposes of illustration and example and that apparatus in accordance with the invention may in practice be rather more complex.

It will also be appreciated that a corner-cube reflector is given by way of example as a preferred form of light returning means. A corner-cube reflector, or modified version thereof, is a convenient reflector which, with relatively small distances involved, can be crude (i.e. not requiring great accuracy) and cheap. Likewise, with small distances, the system is relatively insensitive to small errors in the positional and angular location of the filter and hologram. However, other forms of light returning means could be used such as, by way of further example, a roof edge prism or an arrangement of mirrors. Also, as previously indicated, the system may be arranged to affect more than two reflections of the light at the hologram, in which case an appropriate number of light returning means would be provided to receive and return the successively reflected beams.

Although the input light beam in the specific embodiments disclosed above is described as collimated, it need not necessarily be so. The input light could be in the form of a divergent beam or a convergent beam, and the light return means may then be adapted to compensate or correct for the geometrical form of the beam first reflected from the filter, e.g. may comprise a suitable concave mirror arranged to return a convergent light beam to the filter.

Collimation of the input light beam, when required, is conveniently effected by a suitably shaped end to the fibre optic input cable, but other means for collimating, such as a separate lens, could be provided, and the input means could be other than a fibre optic cable. Further, the resultant or output beam following the two (or more) reflections by the hologram could be received by a receiving means other than a detector, for example by light directing means such as an optical fibre which directs the received light to a remote detector or other device.

The holographic filter or reflector is conveniently, but need not necessarily be, of basically planar form. Thus it preferably comprises a hologram coating, preferably of dichromated gelatine although other materials could be employed, on a basically planar plate-like substrate, preferably of glass although other transparent materials might be used. There may be a cover plate, also preferably of glass, which sandwiches the hologram coating between the substrate and the cover plate in a laminate. However, the hologram coating could be on a non-planar surface of a substrate, e.g. a curved or bent surface, and/or the substrate need not be plate-like in form but could, for example, be a lens or a prism. The hologram is recorded or generated in the coating, and then processed if necessary, in known manner.

The wavelength range of operation of the filter hologram may be selected to suit particular requirements. It may be in the visible part of the electro-magnetic spectrum but need not necessarily; thus it could for example be in the ultra violet or the infra red. The terms 'optical', 'light' and the such when used herein are to be construed accordingly. It will also be understood that reference to a wavelength is sometimes a convenience meaning in practice a narrow waveband, and should be construed accordingly as the context permits.

It will further be understood that references herein to 'along' and the 'length' of the hologram or reflector or filter should not be construed narrowly as necessarily meaning the greatest dimension: in particular, variation 'along the length' could in some circumstances be considered as being across the width.

It will be appreciated that wavelength selective holographic reflectors are advantageously useable in accordance with the invention in a double reflection mode because of their spectral reflectivity characteristics previously described. Thus the desirable effects of high efficiency, a clearly defined passband, and low background which can be achieved generally compare favourably with those which would normally result if a conventional multi-layer interference optical reflection filter were similarly used in a double reflection mode.

I claim:

1. Optical filtering apparatus comprising a holographic wavelength selective reflector, light input means for introducing light to the reflector, light return means for receiving light reflected from the reflector at a first reflection and for returning that light to the reflector for at least a second reflection, said light return means being arranged to return the light to the reflector for said second reflection in a different relationship from that at said first reflection so as to provide different respective wavelength dependent reflectivity characteristics at the two reflections such that the two reflections have relatively shifted, but overlapping, spectral passbands, and receiving means for receiving light reflected at least twice from the reflector.

2. Apparatus according to claim 1 in which the reflector has a varying hologram whose wavelength dependent reflectivity characteristics continuously and progressively change along the length of the hologram.

3. Apparatus according to claim 2 in which the light return means is arranged to effect a spatial displacement between the two reflections relative to the hologram.

4. Apparatus according to claim 2 in which the reflector is linearly moveable relative to the light input means and the light return means so that the positions of the first and second reflections relative to the hologram can be altered.

5. Apparatus according to claim 1 in which the reflector has a substantially uniform hologram and the light return means is arranged to provide a different angle of incidence for the second reflection with respect to the first.

6. Apparatus according to claim 1 in which the reflector has a substantially uniform hologram and the reflector is angularly moveable to alter the angle of incidence of the introduced light at the first reflection, the light return means also being angularly moveable.

7. Apparatus according to claim 1 in which the light return means comprises a corner cube reflector.

8. Apparatus according to claim 1 in which the light return means comprises a modified corner cube reflector having one reflecting face angled so as not to be orthogonal to the other two.

9. Optical filtering apparatus according to claim 1 comprising a holographic wavelength selective reflector having a hologram whose wavelength dependent reflectivity characteristics change along the length of the reflector, said light return means being arranged to receive light reflected from the reflector at a first reflection position therealong and to return that light to the reflector at a second reflection position displaced from said first reflection position, and said receiving means being arranged to receive light reflected successively at said first and second reflection positions from the reflector.

* * * * *